May 5, 1953 A. R. D. ROBSON ET AL 2,637,164
JET SPOILING MEANS FOR AIRCRAFT GAS TURBINES
Filed March 8, 1946 4 Sheets-Sheet 1

ARTHUR RUNYON
DEVEREUX ROBSON,
ALEXANDER PEARCE
JOHNSTONE,
Inventors

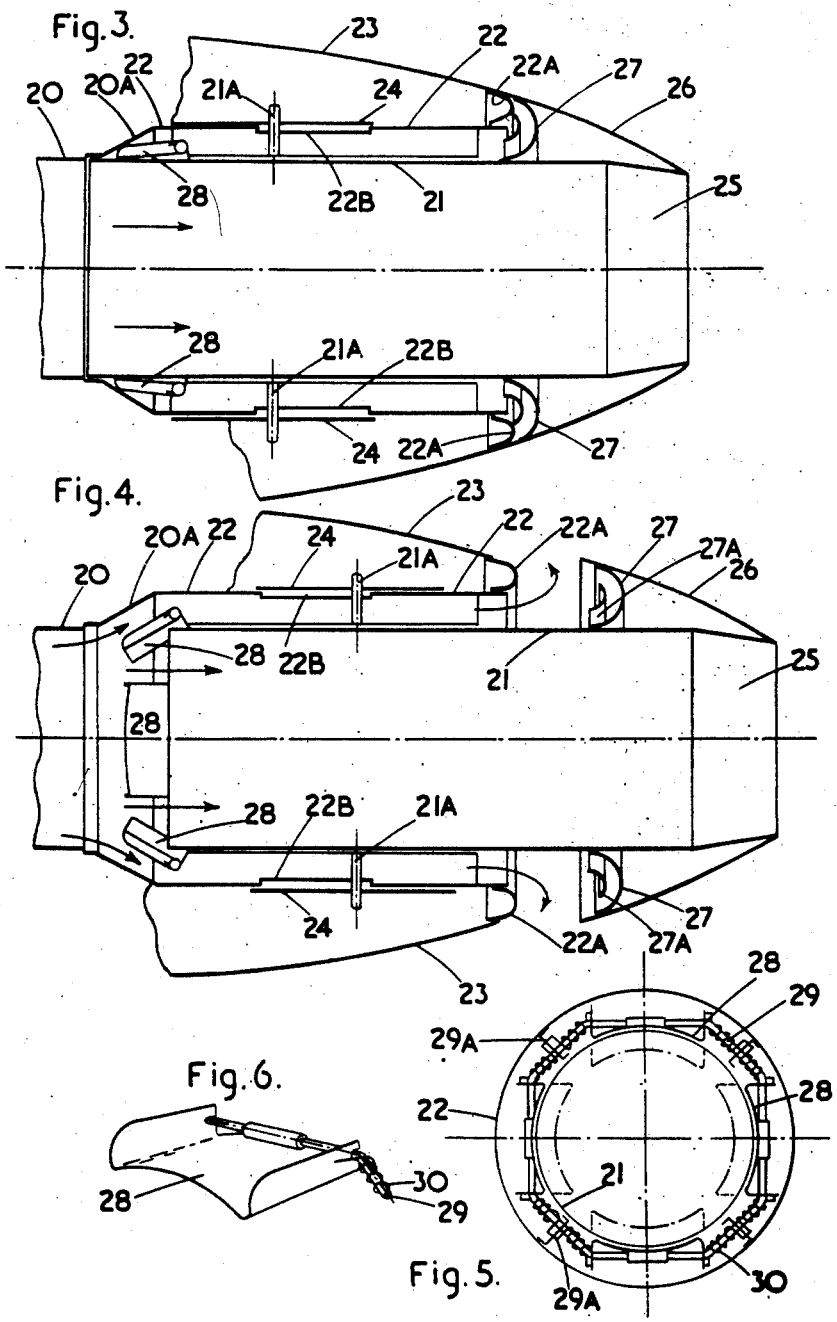

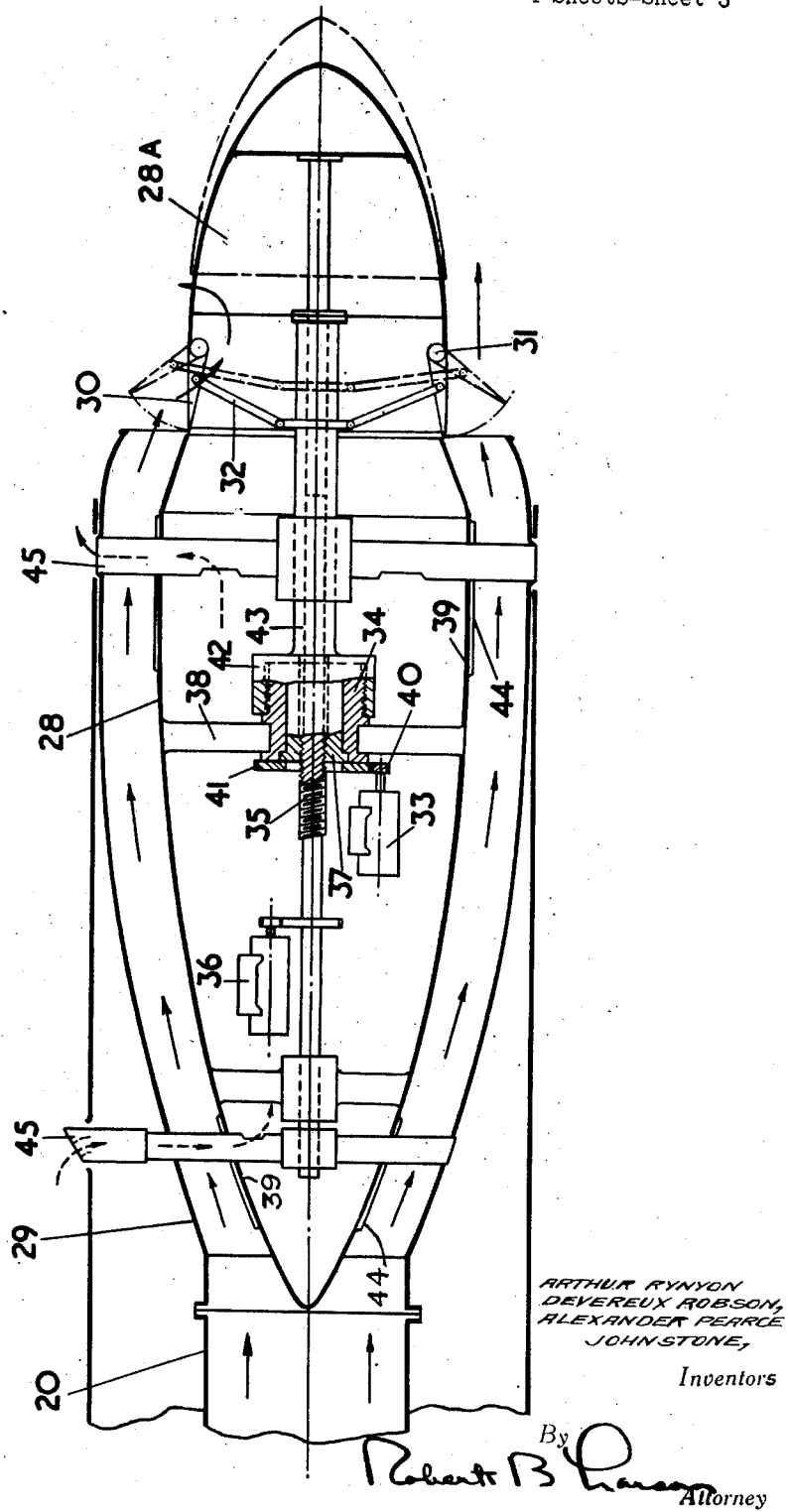

Patented May 5, 1953

2,637,164

UNITED STATES PATENT OFFICE 2,637,164

JET SPOILING MEANS FOR AIRCRAFT GAS TURBINES

Arthur Rynyon Devereux Robson, Dogmersfield, near Basingstoke, and Alexander Pearce Johnstone, Frimley, England, assignors to Power Jets (Research & Development) Limited, London, England Application March 8, 1946, Serial No. 653,118 In Great Britain March 22, 1945

9 Claims. (Cl. 60—35.6)

The invention relates to gas turbine engines for use on aircraft for jet propulsion, and its primary object is to provide new and improved means for what is known as "jet spoiling," that is to say, the deflection of the propulsive jet in such a way as to remove or reduce its propulsive effect and maybe even actually reverse it in the sense of affording negative thrust. Jet propelled aircraft are apt to be aerodynamically clean and it is in their nature that even the small thrust which is generated at idling speeds of engines may be an embarrassment, for example, when approaching to land. It therefore becomes desirable to accord a means for reducing such idling thrust or even providing for negative thrust, that is to say, thrust in the opposite direction to that usually required for propulsion. The conditions of operation of any device closely associated with a jet pipe of an aircraft are usually those of comparatively high temperature, the necessity for lightness of weight, conformity with streamlined forms of aircraft structure and during normal operation very high velocities of flow.

It is particularly important that when not in operation the jet spoiling means shall not in any way impede the flow of the working fluid and that when in use it is preferred that the change in direction of the working fluid should be brought about gradually so that if used for braking purposes, i. e., to produce a negative thrust, the high initial speed of the working fluid towards the nozzle of the jet pipe will be maintained to provide the most efficient braking effect.

The chief object of the invention therefore is to evolve jet spoiling means which will satisfy the above requirements.

The invention is illustrated by the accompanying diagrammatic drawings, which show it in three examples.

Figures 1 and 2, respectively an end view and a sectional view, show what may be its simplest form;

Figures 3 and 4, both sectional views, and 5 and 6, which are respectively an end view and a perspective of a detail, collectively illustrate a second embodiment;

Figure 7 is a sectional elevation of a third embodiment.

Figure 1:
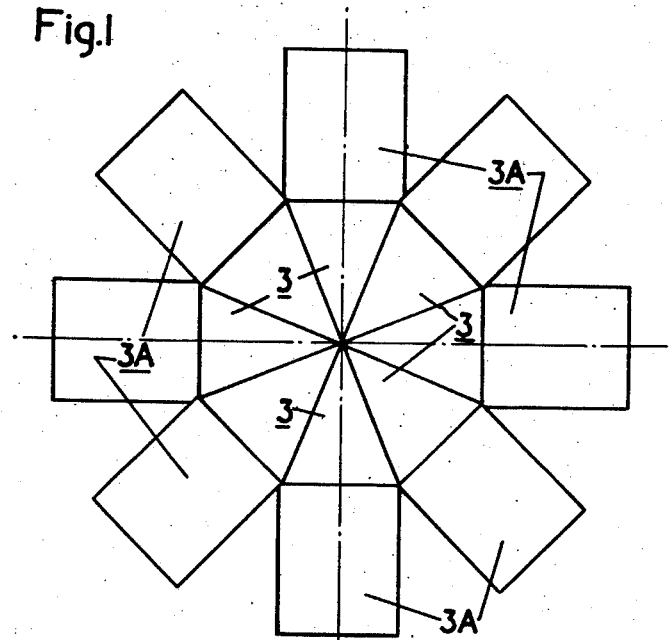
Figure 2:
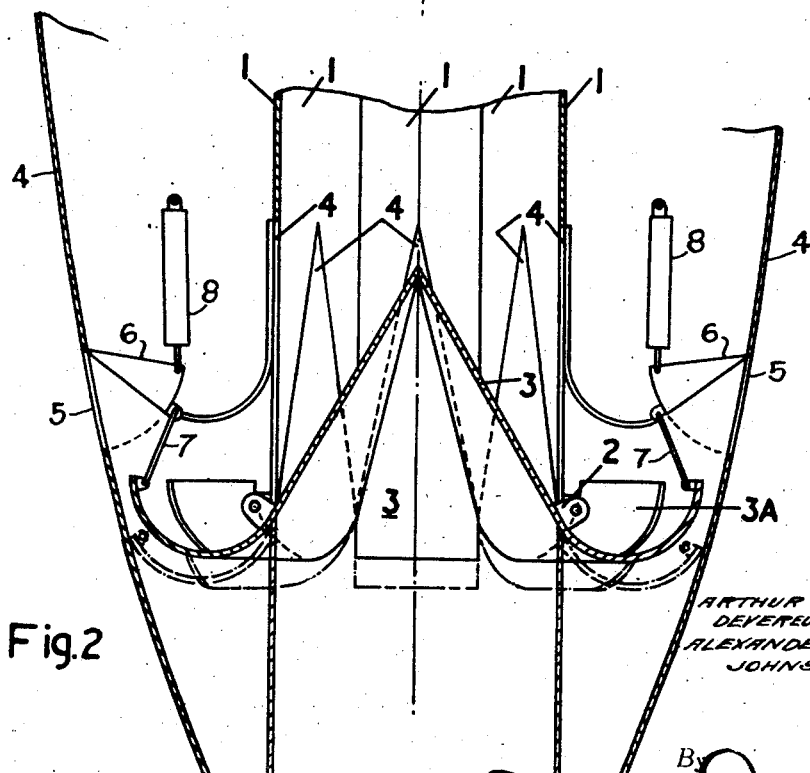

In the case of Figs. 1 and 2, the jet pipe itself is (in the part of its length with which we are concerned) octagonal in section, for ease of construction. If it is to withstand considerable pressures it will therefore have to be appropriately stiff in construction. It can be regarded then as having eight "sides" each being in effect a flat panel. These sides are indicated at 1. Externally near the rear end of each side is arranged a hinge at 2, with axis parallel to the respective side and at right angles to the axis of the pipe. Upon each hinge is pivotally mounted a flap, consisting of a triangular deflector portion 3 which normally lies in and closes a corresponding triangular aperture 4 in the side 1. The portions 3 are flat, but externally of the pipe they have integral extensions 3A which are arcuate sectioned fluid-passage defining means, to guide the deflected working fluid outwards and forwards (relative to the direction of flight) producing negative thrust or "braking." The extensions 3A may in some cases (it being a matter of selection of dimensions and of geometry) be so arranged that when they are operative their adjacent margins meet, presenting a continuous annular wall to the deflected fluid. In other cases, such as that shown, they present a pattern such as that of Fig. 1, which is not deemed to be seriously disadvantageous, because it is improbable that high efficiency will be sought in the negative thrust case, and the gaps between adjacent extensions 3A will probably create strong turbulence, which at least spoils the jet. It will be observed (Fig. 2 especially) that the flaps 3 can be arranged to meet like a pyramid and thus completely obturate the normal propulsive flow in the pipe. This scheme has the possibility of a high degree of balance on the moving elements, so that operating forces may be moderate. The reference numeral 4 indicates an outer casing which is provided with openings 5 which are normally closed by pivoted closure doors 6. These doors 6 are connected by a link 7 to the end of the extensions 3A. Operating means 8, of any convenient form, are connected so as to move the deflectors 3 and the doors 6 between the positions illustrated in Fig. 2 by the full and broken lines.

Turning now to Figs. 3–6, a more elaborate device is presented, and it is shown how the lines of a streamlined nacelle or fuselage may be maintained during operation. A cylindrical jet pipe 20 has an extension 21 which is slidable axially. There is a further cylindrical pipe section 22 coaxially surrounding extension 21, and connected to the end of pipe 20 by a short frusto-conical neck 20A. At its rear end is a further mounting part, which is also a passage-defining wall, in the form of an annulus 22A of arcuate section, which interconnects the end of 22 with the skin 23 of a nacelle or fuselage. By these means the section 22 is mounted. In its wall are formed slots at 22B for the sliding passage of rods 21A which, fixed to the extension 21, control the fore and aft movement of the latter, and outside the section 22 slidably carried, is a sleeve 24 which moves with the rods 21A and which serves to seal the slots 22B. The pipe section 21 carries towards its rear end (where is the final propelling nozzle 25) the trailing end portion of the nacelle, in the form of a skin 26, profiled to correspond with the shape of the skin 23. Within the forward end of this skin 26, is an annular, arcuate section, wall 27 which interconnects the skin 26 with the section 21 to mutually support these elements. The wall 27 also defines an outward and reversal fluid passage, complementarily to the part 22A. There may be a further annular "cascade" vane or ring 27A, to render the direction of the fluid more efficient. It will be apparent by comparing Fig. 3 (normal condition) and Fig. 4 (condition for spoiling and reversal), that rearward movement of the section 21 by any suitable motive means applied to the rods 21A, causes an annular opening to appear between the pipe 20 and section 21, and simultaneously between the skins 23 and 26 in the manner of a sliding door, the annular passage between 21 and 22 then being available for diverted fluid.

Within the pipe 22 near the neck 20A, is a series of flaps 28 (see Fig. 6) each of arcuate section, flanged at its parallel edges for stiffness. These are carried pivotally on a suitably bent hinging rod 29 which is supported through members 29A, by the sections 22. When the section 21 is withdrawn rearwardly these flaps fall inwards towards the interior of the jet pipe and partially obstruct the flow therein, simultaneously diverting fluid through the opening between 20 and 21, and thus into the path above described. When the section 21 is returned forwards, its upstream edge automatically pushes the flaps out to their idle position. The flaps may be spring loaded (as by springs indicated at 30) to this effect.

Fig. 7 illustrates a third form of embodiment in which a jet spoiler system is combined with a variable nozzle jet. In this case a fairing or "bullet" 28 is mounted concentrically in the mouth of the jet pipe 20 which is bell mouthed at 29 to maintain a constant cross-sectional area for the annular gas outlet. Towards the downstream end of the bullet 28 are provided a plurality of deflection plates 30 adapted to pivot about the periphery of a tubular ring 31 attached to the bullet 28 and co-operating with levers 32 and arranged so that in the closed position, as shown in full line, the plates 30 are held in corresponding apertures in the bullet wall, and in the open position as shown in broken line the plates obstruct and divert the normal jet flow in the direction shown by the arrows.

The rear part 28A of the bullet 28 is movable axially by means of a high speed electric motor 33 driving through suitable reduction gear 40, 41, to operate the outer jack screw 34 of a pair of co-axial jacks 34, 35, which in turn operates in casing 42 thus moving said casing axially together with rod 43, ring 31, and part 28A simultaneously. The plates 30 then open and divert the jet flow (as shown by the arrows) through the space between the parts 28 and 28A. Means may be provided (for example a limit switch incorporated on the jack) to cut out the motor when the fully open position is reached and similar means may also be provided for the fully closed position.

A variable area nozzle effect is provided in that the whole bullet 28 is also capable of axial movement. This is effected by means of an electric motor 36 which operates the inner jack screw 35 and thence moves casing 37 rigid with support 38 which is itself rigid with bullet 28. To allow for this movement slots 39 are provided in the bullet wall and sealed by flaps 44. Operation of motor 36 can thus move the whole bullet in the jet pipe 20, and thus give a variable area nozzle effect. The strut 45 is hollow for the admission of cooling air which may be led in from atmosphere by an external scoop and flows in the direction indicated by the broken arrows.

Figure 8:
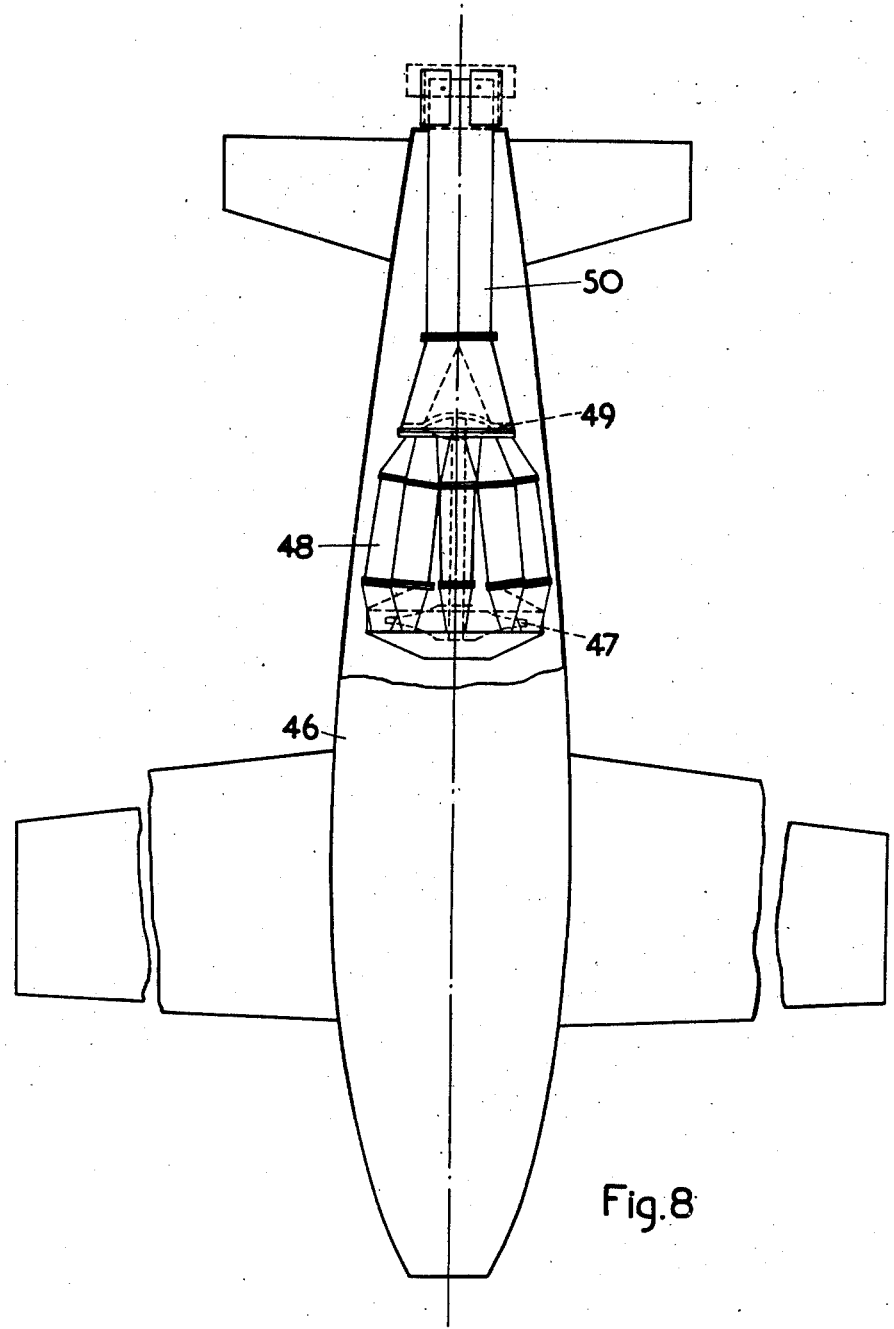
Figure 8 is a perspective diagrammatic view of an aircraft having a gas turbine aero-engine provided with jet spoiling means according to the invention.

Figure 8 is a perspective diagrammatic view of an aircraft in the fuselage 46 of which is fitted a gas turbine aero-engine comprising a compressor 47 delivering air which after being injected with fuel and brought to combustion in combustion chambers 48 drives a turbine 49 which itself drives the compressor 47, the hot gases being then ejected to atmosphere through a jet pipe 50 to produce thrust. The jet spoiling apparatus according to the invention is attached towards the downstream outlet of the jet pipe 50.

We claim:

1. In an aircraft gas-turbine plant fitted with a jet pipe for the rearward efflux of a stream of the working fluid as a propulsive jet, and thrust-spoiling means associated with said jet pipe, comprising, in combination, an upstream pointing deflector associated with said jet pipe, guide means located downstream from said deflector and without the rearward path of the said jet set to define a path for the working fluid changing from the rearward direction to a thrust-spoiling direction, said guide means being movable from inoperative to thrust-spoiling position and when in thrust-spoiling position having its exit directed radially outwardly from said jet pipe, means mechanically interconnecting said deflector and said guide means, and means for moving said guide means to thrust-spoiling position and the upstream end of said deflector into and progressively across said stream to positions in which it progressively decreases the cross-section of the rearwardly-directed jet while at the same time deflecting some of the working fluid rearwardly into the said guide means.

2. In an aircraft gas-turbine plant with a jet pipe and thrust-spoiling means arrangement as set forth in claim 1, a separate casing disposed about the axis of the jet-pipe forming a passage and enclosing said guide means, a closure means in said casing which can be opened to permit access of said passage to the atmosphere, and an operating-connection between said closure means and said deflector constraining them to move together, said closure means being opened as the deflector moves into and across the stream.

3. In an aircraft gas-turbine plant fitted with a jet pipe for the rearward efflux of a stream of the working fluid as a propulsive jet, and thrust-spoiling means associated with said jet pipe, comprising, in combination, upstream pointing deflector means mounted around the axis of said jet pipe, guide means disposed around the axis of said jet pipe down-stream from said deflector and located without the rearward path of the said jet to define a path for the working fluid changing from the rearward direction to a thrust-spoiling direction, said guide means being movable from inoperative to thrust-spoiling position and, when in thrust-spoiling position, having its exit directed radially outwardly from said jet pipe, means mechanically interconnecting said deflector and said guide means, and means for moving said guide means to thrust-spoiling position and the upstream end of said deflector into and progressively across said stream to positions in which it progressively decreases the cross-section of the rearwardly-directed jet while at the same time deflecting some of the working fluid rearwardly into the said guide means.

4. In an aircraft gas-turbine plant fitted with a jet pipe for the rearward efflux of a stream of the working fluid as a propulsive jet, said jet pipe having at least one apertured part therein, and thrust-spoiling means associated with said jet pipe, comprising, in combination, an upstream pointing deflector-plate, a curved guide plate formed as an integral extension of said deflector-plate adjacent the apertured part of said jet pipe and lying outside the jet pipe to define a path for the working fluid changing smoothly from the rearward direction to a thrust-spoiling direction, and pivotal mounting means for said combined deflector-plate and guide-plate permitting movement of the upstream end of the deflector-plate into the pipe and progressively across the said stream to positions in which it progressively decreases the cross-section of the rearwardly-directed jet while at the same time providing a path for some of the working fluid rearwardly along the deflector-plate and then along the guide-plate into the thrust-spoiling direction.

5. In an aircraft gas-turbine plant fitted with a jet pipe for the rearward efflux of a stream of the working fluid as a propulsive jet, said jet pipe having at least one apertured part therein and thrust-spoiling means associated with said jet pipe, comprising, in combination, an upstream pointing deflector-plate, a plurality of curved guide-plates formed as an integral extension of said deflector-plate adjacent the apertured part of said jet pipe and disposed around the outside of the jet pipe to define for the working fluid, a path disposed around the jet pipe changing smoothly from a rearward direction to a thrust-spoiling direction, and pivotal mounting means for each of said combinations of deflector-plate and guide-plate, permitting movement of the upstream end of each deflector-plate into the pipe and progressively decreases the cross-section of the rearwardly-directed jet while at the same time providing a path for some of the working fluid rearwardly along the deflector-plate and then along the guide-plate into the thrust-spoiling direction.

6. In an aircraft gas-turbine plant fitted with a jet pipe for the rearward efflux of a stream of working fluid as a propulsive jet, and thrust-spoiling means associated with said jet pipe, comprising, in combination, a wall outside said jet pipe defining an outer passage between said wall and said jet pipe, a deflector located at the forward end of the outer passage, guide means lying outside said jet pipe to define a path, which is a rearward continuation of the outer passage, for the working fluid changing smoothly from rearward direction to a thrust-spoiling direction, said guide means having its exit end directed radially outwardly and located adjacent said wall forming a terminus for the rearward end of said wall, and means moving the upstream end of said deflector into and progressively across said jet pipe to positions in which it progressively decreases the cross-section of the rearwardly directed stream of working fluid, while at the same time deflecting some of the working fluid into said outer passage.

7. In an aircraft gas-turbine plant, fitted with a jet pipe and a co-axial rearward extension of said jet pipe for the rearward efflux of a stream of the working fluid as a propulsive jet, said extension being axially movable in a rearward direction to form a gap between the extension and the rest of the jet pipe, an outer larger pipe surrounding said extension to define therewith an outer annular passage communicating with the interior of the jet pipe through said gap when the extension is moved rearwardly, guide means at the rear end of said outer annular passage defining a path for the working fluid changing smoothly from the rearward direction to a thrust-spoiling direction, and a plurality of upstream-pointing deflectors each mounted for movement of its upstream end, on rearward movement of said jet pipe extension, into and progressively across the said stream to positions in which it progressively decreases the cross-section of the rearwardly-directed jet while at the same time deflecting some of the working fluid into said outer passage.

8. In an aircraft gas-turbine plant, the combination as set forth in claim 7, wherein a part of said guide means is attached to said movable jet pipe extension to constitute a sliding door movable rearwardly with said jet pipe extension to vent said outer annular passage to atmosphere.

9. In an aircraft gas-turbine plant, the combination as set forth in claim 1, and a hollow body in said set pipe around which said jet stream normally flows, an end portion of said hollow body being movable rearwardly away from the main portion of said hollow body to form said guide means and said deflectors located upstream of said end portion and being movable into the jet stream to positions in which it progressively decreases the cross-section of the rearwardly-directed jet while at the same time deflecting some of the working fluid into said hollow body end portion.

ARTHUR RYNYON DEVEREUX ROBSON.
ALEXANDER PEARCE JOHNSTONE.

References Cited in the file of this patent

UNITED STATES PATENTS

| Number | Name | Date |
|---|---|---|
| 340,237 | Nagel et al. | Apr. 20, 1886 |
| 1,306,913 | Kitchen | June 17, 1919 |
| 1,344,518 | Rees | June 22, 1920 |
| 1,415,705 | Rees | May 9, 1922 |
| 1,572,812 | Rees | Feb. 9, 1926 |
| 1,714,917 | Martin | May 28, 1929 |
| 2,094,707 | Jones | Oct. 5, 1937 |
| 2,396,911 | Anxionnaz et al. | Mar. 19, 1946 |
| 2,418,488 | Thompson | Apr. 8, 1947 |

FOREIGN PATENTS

| Number | Country | Date |
|---|---|---|
| 14,631 | Great Britain | July 15, 1905 |
| 103,325 | Great Britain | Jan. 19, 1917 |
| 580,174 | Germany | July 6, 1933 |